United States Patent
Lang

(10) Patent No.: US 7,286,925 B2
(45) Date of Patent: Oct. 23, 2007

(54) METHOD FOR PULSATION CORRECTION WITHIN A MEASURING DEVICE MEASURING A MEDIA MASS FLOW

(75) Inventor: Tobias Lang, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 64 days.

(21) Appl. No.: 11/242,722

(22) Filed: Oct. 3, 2005

(65) Prior Publication Data
US 2006/0224298 A1    Oct. 5, 2006

(30) Foreign Application Priority Data
Oct. 1, 2004    (DE)    ................... 10 2004 047 786

(51) Int. Cl.
*G01F 1/72* (2006.01)
(52) U.S. Cl. ..................... 701/114; 73/118.2
(58) Field of Classification Search ............... 701/114, 701/115, 101, 102; 73/116, 117.3, 118.2
See application file for complete search history.

(56) References Cited

U.S. PATENT DOCUMENTS

| | | | | |
|---|---|---|---|---|
| 4,838,078 A | * | 6/1989 | Tsutsumi | ................ 73/118.2 |
| 4,932,382 A | * | 6/1990 | Fujimoto et al. | ........... 123/488 |
| 5,014,550 A | * | 5/1991 | Gee et al. | .................. 73/118.2 |
| 5,167,152 A | * | 12/1992 | Shimizu et al. | ......... 73/204.18 |
| 5,646,344 A | * | 7/1997 | Konzelmann | ............ 73/204.18 |
| 5,889,203 A | * | 3/1999 | Wild et al. | ................. 73/117.3 |

FOREIGN PATENT DOCUMENTS

DE    197 43 340    4/1999

* cited by examiner

*Primary Examiner*—Hieu T. Vo
(74) *Attorney, Agent, or Firm*—Kenyon & Kenyon LLP

(57) ABSTRACT

A method and a device for the pulsation correction of measured values of a flow device, which is used to measure pulsating gas flows in internal combustion engines. A raw signal of the flow sensor is fed to an adder of a compensation circuit. The raw signal is at the same time fed to a multiple frequency filter, which has at least one high-pass filter, at least one low-pass filter and at least one band-pass filter. The filtered signals are written into addresses of a correction characteristics map. The values stored in addresses are added to the raw signal by the adder.

12 Claims, 8 Drawing Sheets

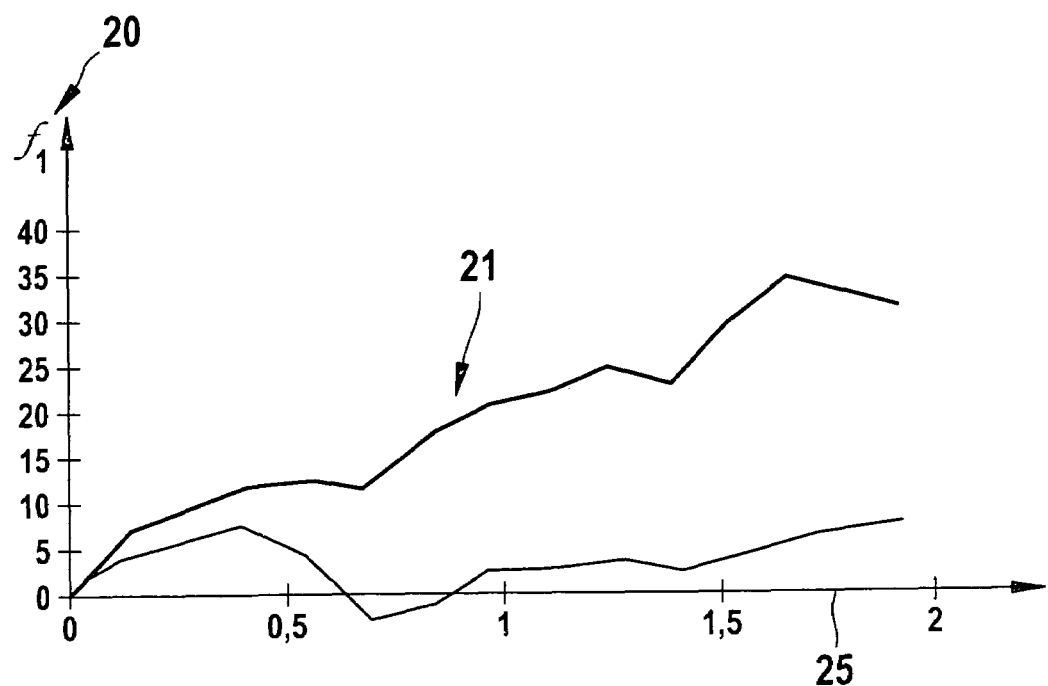
Fig. 3.1
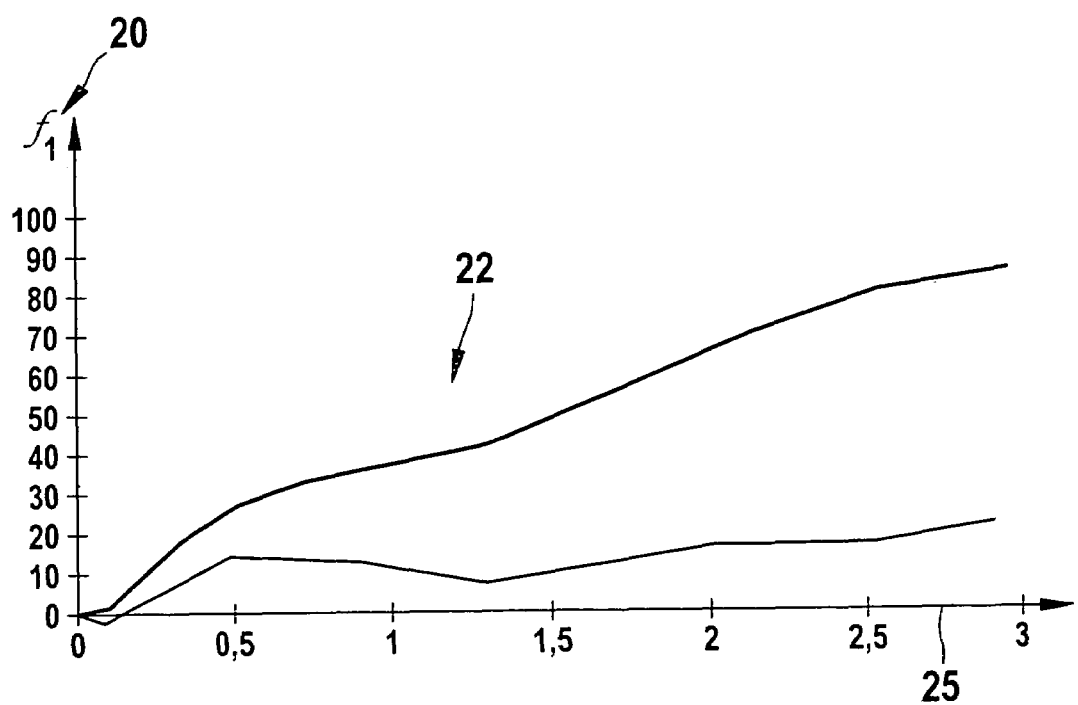
Fig. 3.2

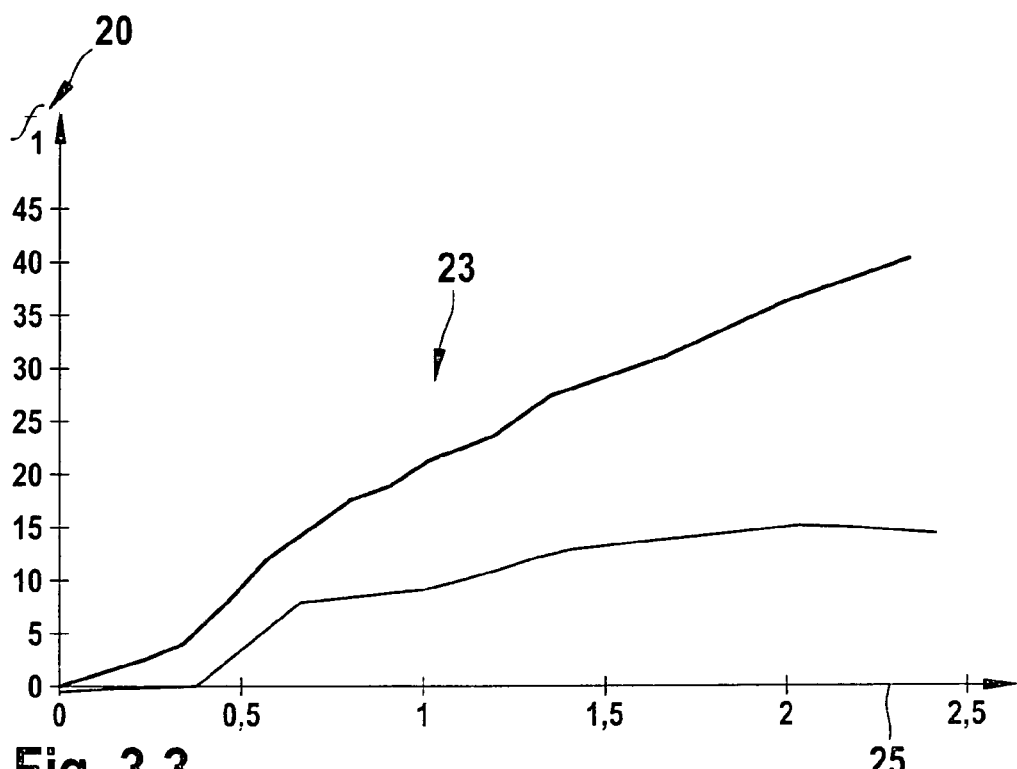
Fig. 3.3
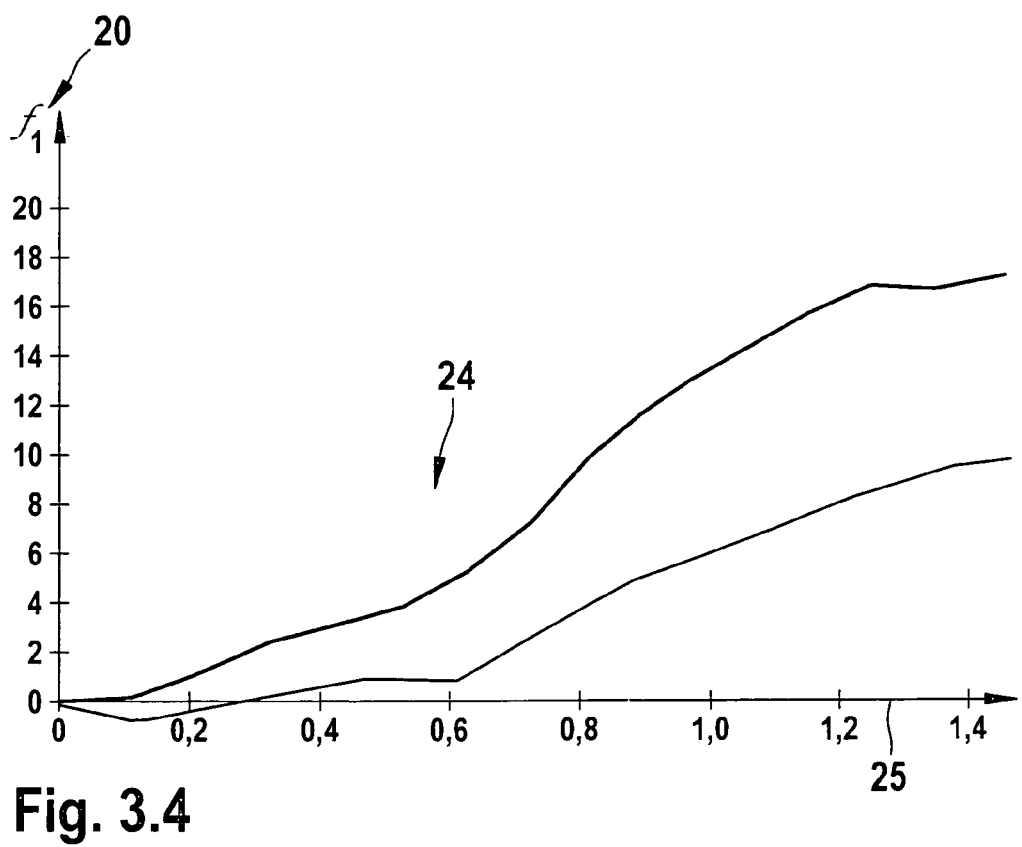
Fig. 3.4

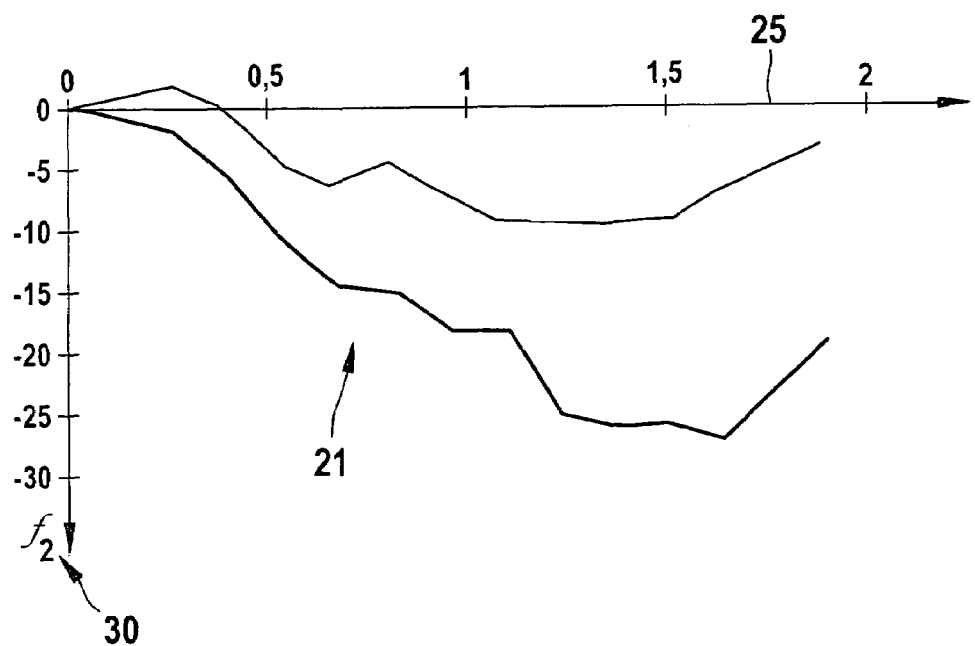
Fig. 4.1
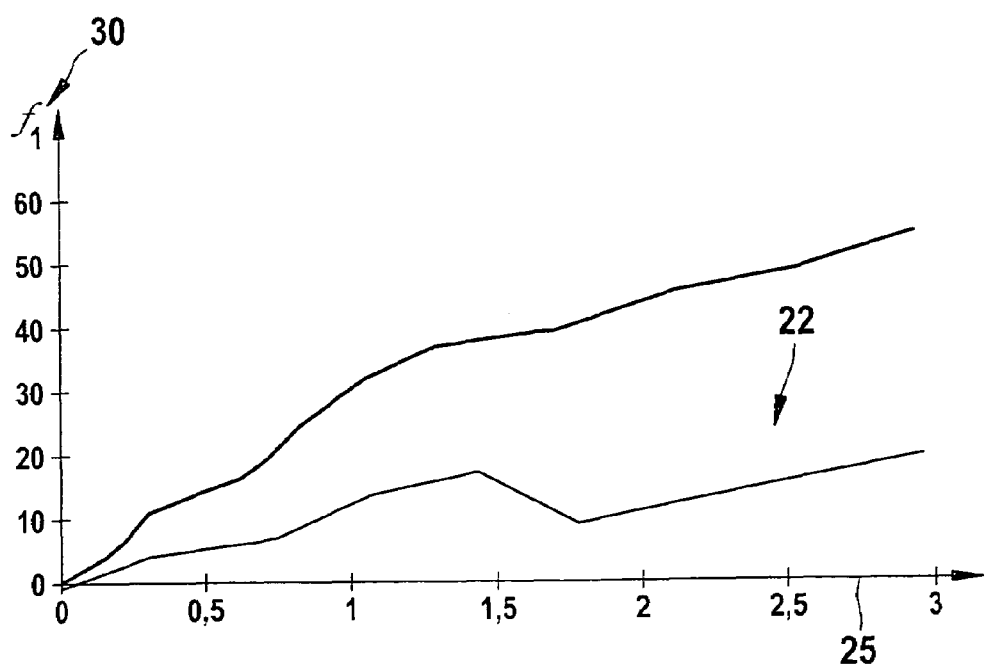
Fig. 4.2

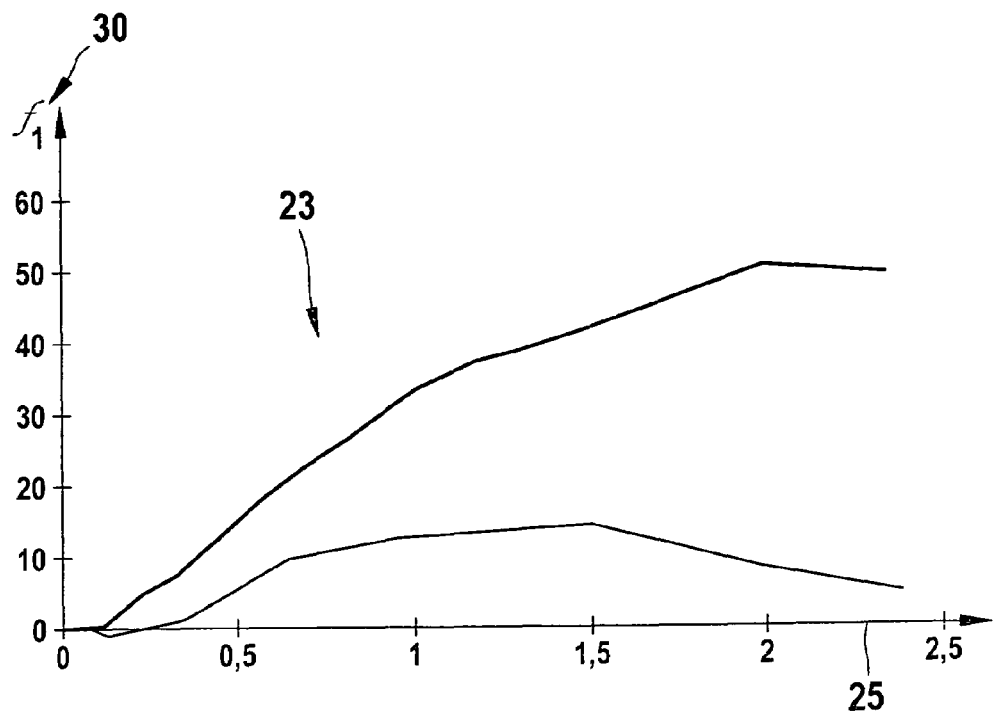
Fig. 4.3
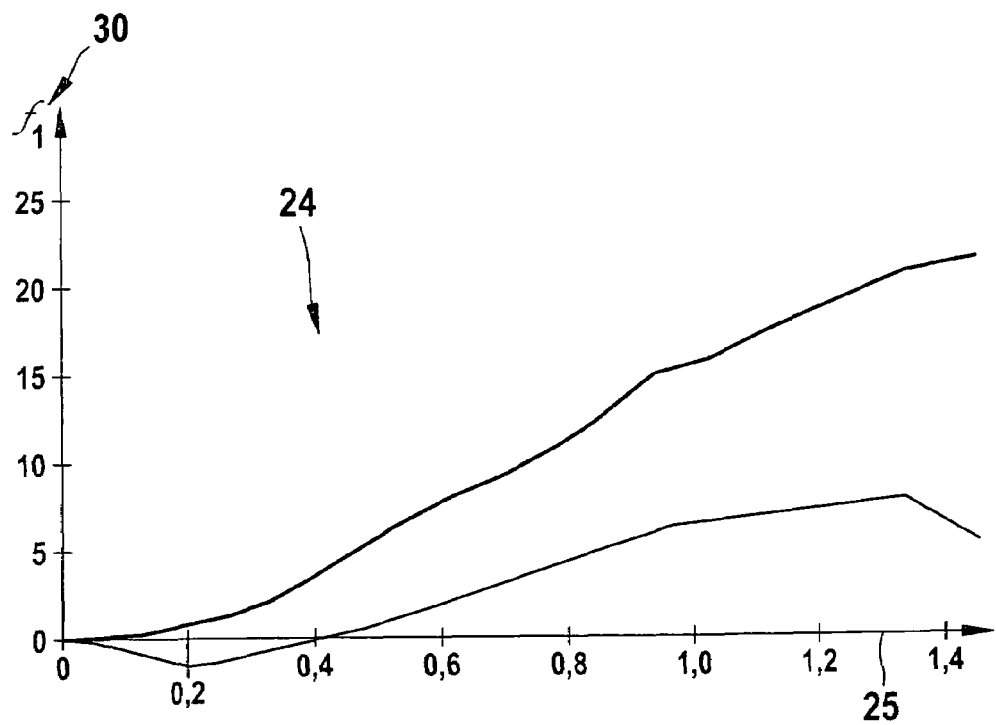
Fig. 4.4

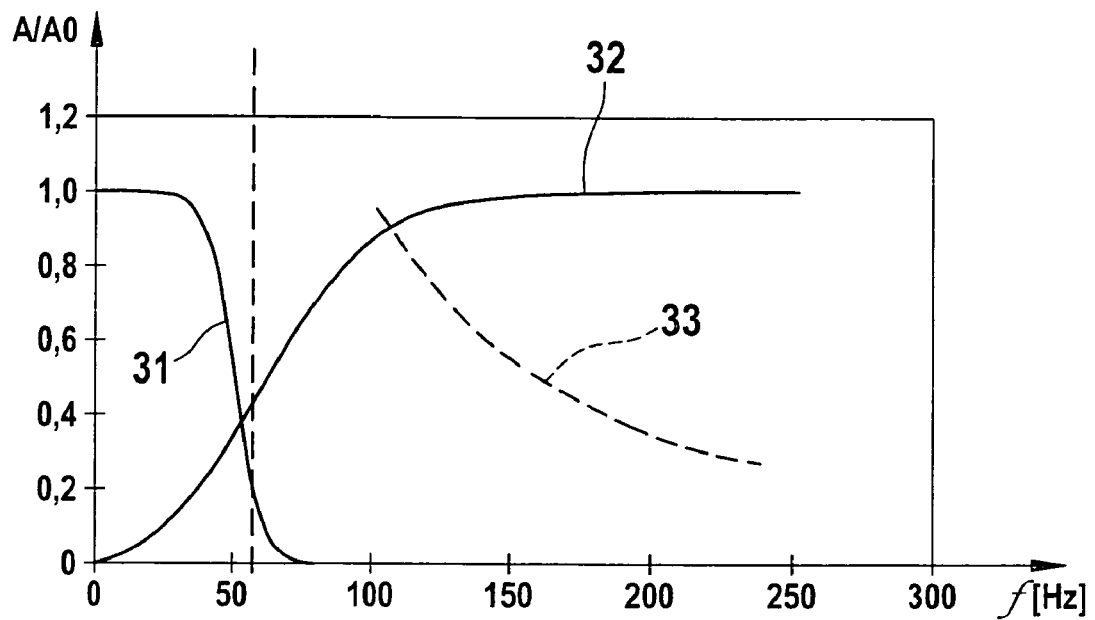
Fig. 5.1
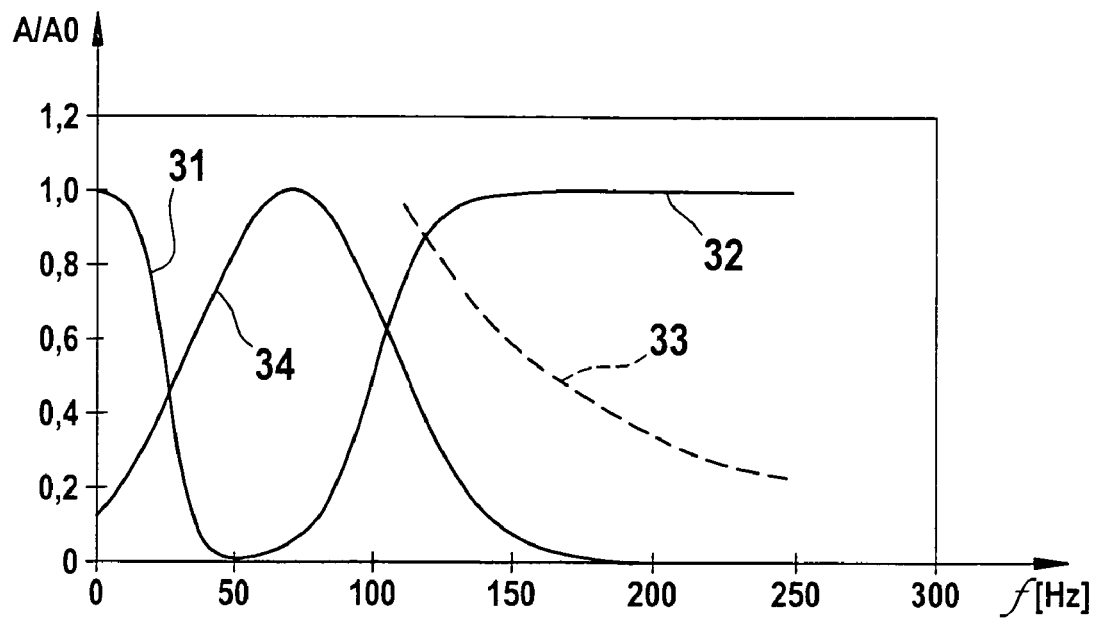
Fig. 5.2

METHOD FOR PULSATION CORRECTION WITHIN A MEASURING DEVICE MEASURING A MEDIA MASS FLOW

FIELD OF THE INVENTION

Flow sensors or air mass flow sensors are known in practice for measuring flow velocities, volume flows or air mass flows. With the aid of these devices, the corresponding variable is output as a signal value, be it as voltage, as frequency, as pulse-width ratio etc., in accordance with a characteristic curve. The characteristic curve, however, in this context usually corresponds to static air mass flows. For this reason, correction methods must be used in the case of pulsating flows.

BACKGROUND INFORMATION

In order to correct false indications in the case of pulsating flows, for example in the intake tract of an internal combustion engine, the following methods are used.

A correction map is stored in the engine control unit of the internal combustion engine, which can be addressed via the characteristic quantities of the speed of the internal combustion engine (measured via a speed sensor) and the load (e.g. the throttle valve opening position). In addition, nonlinear optimized characteristic curves are used in engine control units.

Raw signals $U_{HFM}$ of an air mass detector are detected in that the air mass detector is exposed to an air mass flow m at different operating points on an engine test bench and the signal generated by the air mass detector is recorded. The raw signals $U_{HFM}$ of the air mass detector are converted into air mass flow values by interpolation on an output characteristic. Subsequently, average values of the air mass flow values are formed via integral multiples of a pulsation period for the respective operating points of the internal combustion engine, given by the speed and the specific output. A deviation dm/m, which corresponds to the average deviation of the average air mass flow of a comparison air mass flow, is calculated for the respective operating points (n, $p_{ME}$) of the internal combustion engine. Subsequently, the quadratic norm ($X^2$) over the matrix of the deviation is calculated. An adjusted characteristic curve in the sense of an optimization is produced, the characteristic curve being optimized with respect to the condition that the quadratic norm ($X^2$) becomes a minimum. The raw signals $U_{HFM}$ of the air mass detector are converted into air mass flow values by interpolation to the adjusted characteristic curve, several of the above-mentioned method steps being iteratively run through by repetition.

A flow meter is known from German Published Patent Application No. 197 43 340. The flow meter takes the form of a measuring tube through which the medium to be measured flows, the medium being exposed to at least one ultrasonic transmitter/receiver unit. At least one reflector is situated in the measuring tube for reflecting an ultrasonic signal sent by an ultrasonic transmitter/receiver unit either directly or via a reflection on a measuring tube wall in the direction of the same or of other ultrasonic transmitter/receiver units. To avoid surface waves in the reflection, an angle of incidence of the ultrasonic signal on a reflector, measured between a normal to the surface and a reflector and the incident ultrasonic signal, is provided, which is greater than a Rayleigh angle or the material properties of the reflectors have an appropriately high Rayleigh speed or there is a combination of these.

SUMMARY OF THE INVENTION

Following the method provided according to the present invention, a more precise measurement of air mass flows can be achieved even in pulsating, i.e. non-static air mass flows. When used in the intake tract of an internal combustion engine, for example, this allows for a more precise detection of the charge of the individual cylinders, which in turn makes possible a clear reduction of the emission of pollutants of the internal combustion engine.

The present invention provides for an air mass signal representing an air mass flow to be processed in a nonlinear manner, the nonlinear processing preferably already occurring within the sensor. Since no information exists in the air mass sensor about the operating state of the internal combustion engine with respect to speed and load, no characteristics map can be stored in the air mass sensor itself, which could be addressed via these variables known in the engine control unit. The present invention therefore provides for the use of a correction characteristics map internal to the sensor, which is addressed via variables that are obtained from the raw signal of the sensor itself following an appropriate frequency filtering. For this purpose, empirically known, nonlinear characteristics of the sensor geometry, particularly of a bypass channel, can be utilized. This procedure allows one to dispense with painstaking transformation methods such as e.g. a Fourier transform.

A decisive advantage over an exclusive use of a correction characteristics map in the control unit lies in the fact that all relevant influence variables are taken into account. In the control unit of the internal combustion engine, by contrast, in addition to speed and load, there are in part also new pulsation-determined parameters such as e.g. camshaft settings, which do not enter into the characteristics map addressing of a characteristics map stored in an engine control unit. In the case of strong pulsations, these parameters result in errors in the air mass signal that cannot be compensated.

In an advantageous, previously unknown manner, it is possible to correct false indications that cannot be compensated, which allows for a significantly more precise detection of the charge of the cylinders of the internal combustion engine with the air mass required for combustion. Compared to previously used characteristic curve and characteristics map concepts, the method provided according to the present invention not only takes into account the current signal state of the flow sensor element of an air mass flow sensor, for example, but also its temporally preceding values.

An almost complete error-correction may be achieved simply by frequency-filtering the raw signal. Following the frequency filtering of the raw signal, the obtained signals are smoothed and used to address a characteristics map. The values of the respectively addressed characteristics maps are added to the raw signal. In this manner it is possible individually to correct false indications in the dependence on the pulsation frequency, the pulsation amplitude and the average air mass flow (which corresponds to the amplitude of the frequency 0). Depending on the justifiable expense and the required compensation ability, the size of the characteristics map and of the frequency filters used may be reduced. Thus it is already possible to achieve an effective pulsation correction with the aid of transfer functions. A particularly simple possibility for frequency filtering is provided by a low-pass and a high-pass filter.

BRIEF DESCRIPTION OF THE DRAWINGS

FIGS. 3.1 to 3.4 show pulsation errors of an air mass flow sensor sample at a frequency of f =58 Hz.

FIGS. 4.1 to 4.4 show pulsation errors of an air mass flow sensor sample at a pulsation frequency of f=145 Hz.

FIG. 5.1 shows frequency response characteristics of a low-pass and of a high-pass filter.

FIG. 5.2 shows frequency response characteristics of a low-pass, a band-pass and a high-pass filter.

DETAILED DESCRIPTION

Figure 1:
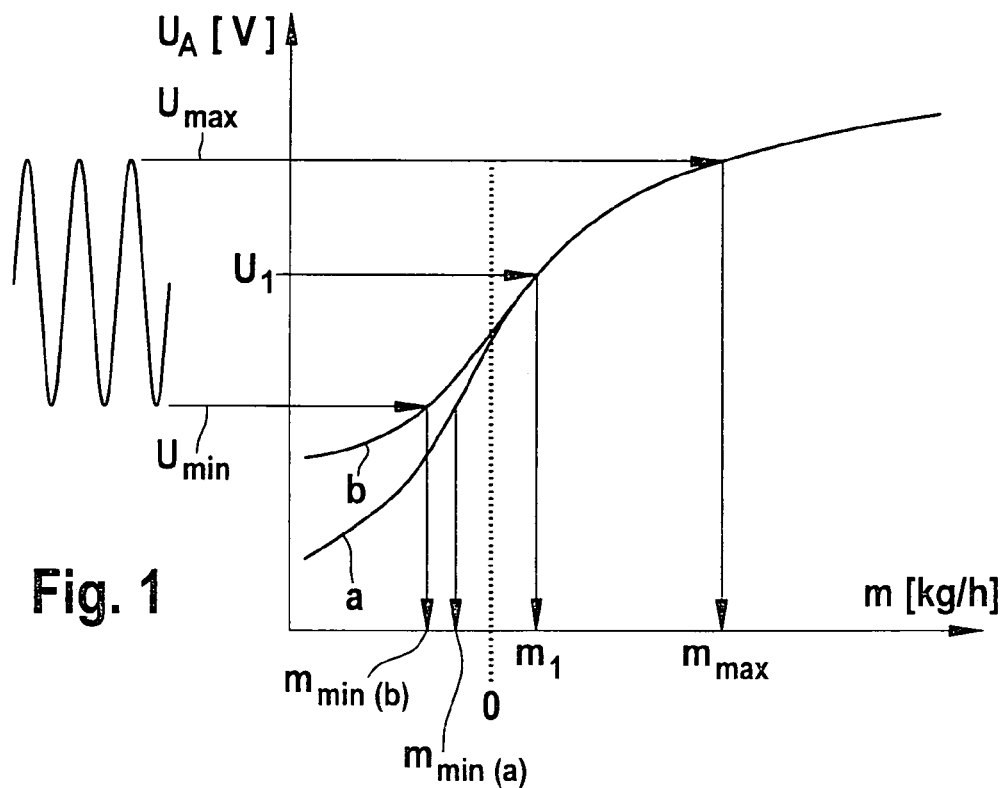
FIG. 1 shows a pulsation correction by non-linear characteristic curve distortion.

FIG. 1 shows a pulsation correction by non-linear characteristic curve distortion. In the non-linear characteristic curve optimization, the characteristic curve for converting signal voltages $U_A$ into air mass flows m is distorted in such a way that false pulsation indications are at least partially corrected and pulsation-free static flows are likewise indicated as correctly as possible. In the characteristic curve represented in FIG. 1, the characteristic curve pattern a is changed by a modified characteristic curve pattern b. A constant signal voltage $U_1$ is converted into an associated corrected air mass signal $m_1$. If pulsations of the signal voltage $U_A$ occur, given by $U_{max}$ (maximum signal voltage) and $U_{min}$ (minimum signal voltage), then, depending on the specific sensor properties, an excess indication may result for example. In the case of $U_{max}$, an inference is made to a maximum air mass flow $m_{max}$; while in the case of the minimum of the pulsation at $U_{min}$ of the signal voltage, a minimum air mass flow $m_{min}$ is inferred. The air mass flow signal generated for signal voltage $U_A$ for value $U_{min}$ may now be converted into an air mass flow m both on original characteristic curve a as well as on modified characteristic curve b. In case of the correlation via the original characteristic curve a, $m_{min}$ (a) is inferred from $U_{min}$. If b is read off from the modified characteristic curve b, then air mass flow $m_{min}$ (b) results for the minimum signal voltage $U_{min}$. In the case of pulsations having reverse flow components, a relative diminished indication may be generated by modifying the characteristic curve and thus the false indication—correlation via the original characteristic curve a—may be compensated. By this method explained in connection with FIG. 1, however, it is possible to compensate for false indications only incompletely since these also depend on the average air mass flow, on the pulsation amplitude, i.e. the difference between $U_{max}$ and $U_{min}$, as well as on the pulsation frequency.

Figure 2:
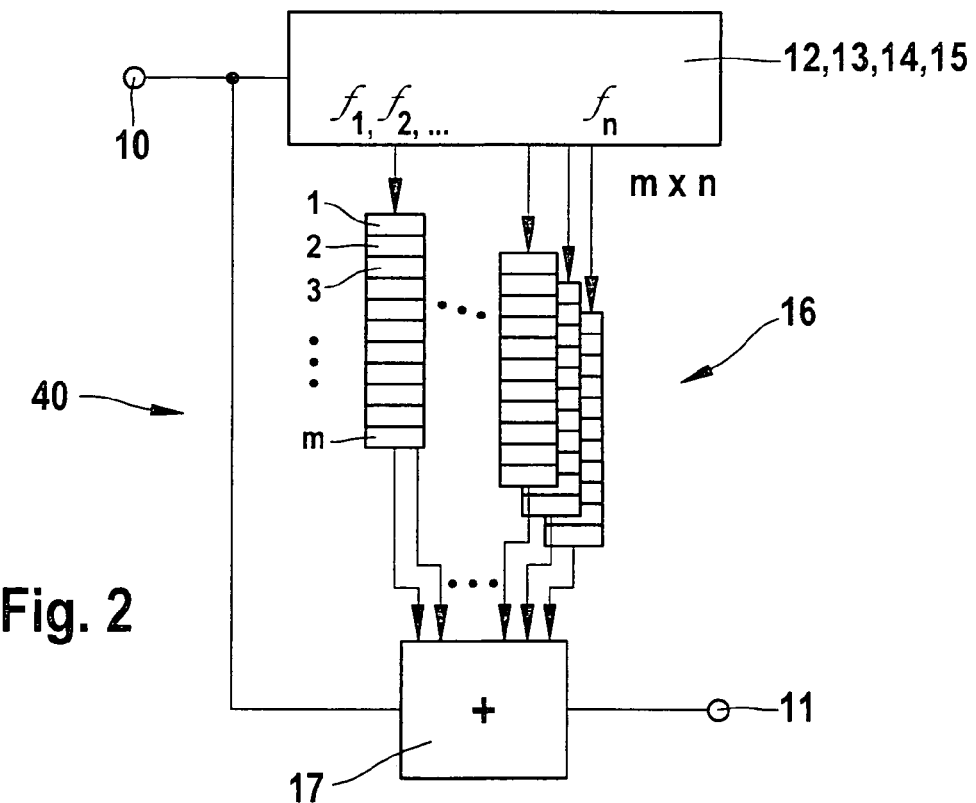
FIG. 2 a compensation circuit for error correction by signal filterings.

FIG. 2 shows a compensation circuit for error correction by signal filtering.

A nearly complete error correction may be achieved by the compensation circuit shown in FIG. 2. Reference numeral 10 indicates the signal input, while reference numeral 11 marks the signal output. The signal entering at signal input 10 is supplied to a multiple frequency filter 12 and parallel to an adder 17. Multiple frequency filter 12 comprises, for example, a low-pass filter 13, a high-pass filter 14 as well as a band-pass filter 15, which can optionally have a smoothing function connected in the outgoing circuit.

The signals filtered by multiple frequency filter 12 are smoothed and used for addressing a correction characteristics map 16. Correction characteristics map 16 is constructed as an m x n matrix. The frequency components $f_1, f_2, \ldots f_n$ are written into addresses 1, 2, 3, . . . m of correction characteristics map 16 and in the addition are added to the raw signal applied at signal input 10. This makes it possible individually to correct false indications as a function of the pulsation frequency, the pulsation amplitude and the average air mass flow. The average air mass flow corresponds to the amplitude for frequency 0, i.e. of the low-pass output. FIG. 2 shows the most general possibility for implementing a compensation circuit for error correction by signal filtering. Depending on the justifiable expenditure and the required compensation ability, the size of correction characteristics map 16 and the size of multiple frequency filter 12 may be reduced. An effective pulsation correction can already be implemented, for example, by the transfer functions shown in FIGS. 5.1 and 5.2. The representation of the sequence of FIGS. 3.1, 3.2, 3.3 and 3.4 shows pulsation errors of an air mass flow sensor pattern, which were recorded at a standard frequency of e.g. f=58 Hz. Reference numeral 21 indicates a first air mass flow of e.g. 10 kg/h, reference numeral 22 a second air mass flow of e.g. 30 kg/h, reference numeral 23 a third air mass flow of e.g. 60 kg/h, and reference numeral 24 a fourth air mass flow of e.g. 90 kg/h, while reference numeral 25 indicates the pulsation amplitude.

FIGS. 3.1, 3.2, 3.3 and 3.4 each show in the upper curve the pattern of an original air mass flow sensor signal as well as in the lower curve a signal corrected by the compensation circuit shown in FIG. 3.

For first air mass flow 21 shown in FIG. 3.1, a significant reduction of the error in the order of 5% may be achieved by frequency filtering the signal using the compensation circuit in accordance with FIG. 2, while the sensor signal at a rising pulsation amplitude 25 may be faulty by up to 30%.

In FIG. 3.2, the original air mass flow sensor signal for second air mass flow 22 of 30 kg/h is plotted against pulsation frequency 25. With increasing pulsation frequency, the original signal takes on a steadily rising pattern, and at greater pulsation amplitudes 25 has errors that are greater than 40% and thus unusable. In the lower curve path in FIG. 3.2, a signal corrected by the evaluation circuit according to FIG. 2 is entered, which still is 7% faulty. FIG. 3.3 shows the signal pattern of the original sensor signal for a third air mass flow of 60 kg/h. With the rise of pulsation amplitude 25, the original air mass flow sensor signal is 25% faulty, while the signal filtered by the compensation circuit according to FIG. 2 shows an error in the order of 10%.

FIG. 3.4 shows the original air mass flow sensor signal for the fourth air mass flow of approx. 90 kg/h, which at a rising pulsation amplitude has an error in the order of 20%. In contrast, the signal filtered and smoothed by the compensation circuit according to FIG. 2 shows a significant error of between 2 and 8% only starting at a pulsation amplitude of 0.6.

The representations of FIGS. 4.1, 4.2, 4.3 and 4.4 show the air mass flows 21, 22, 23 and 24 at a second frequency 30 of $f_2$=145 Hz or the signal resulting from these plotted against pulsation amplitude 25.

As emerges from a comparison of the two curve patterns shown in FIG. 4.1, with a rising pulsation amplitude 25, the original signal of the air mass flow sensor represented by a bolded line has a sharply increasing error in the order of between 20 and 30%. By contrast, with an increasing pulsation duration, the signal, represented by a thinner line, which is filtered and smoothed by the compensation circuit according to the representation in FIG. 2, only has an error of approximately 10%.

The situation is similar for the second air mass flow 22 (30 kg/h). With an increasing pulsation amplitude, the signal originally produced by the air mass flow sensor is in the order of beyond 30%, while the signal filtered and smoothed by the compensation circuit according to FIG. 2 has an error in the order of between 10 and 15% even at pulsation amplitudes of >2.5.

FIG. 4.3 shows the errors of the original signal pattern of the air mass flow sensor as well as the pattern of a signal filtered and smoothed by the compensation circuit according to the representation in FIG. 2 for a third air mass flow of approximately 60 kg/h. At pulsation amplitudes 25, which are >1, the original signal generated by the air mass flow sensor are faulty at 30% and are thus no longer usable. By contrast, the signal filtered and smoothed by the compensation circuit according to the representation in FIG. 2 has a maximum error of 12%, which at a pulsation amplitude 25 of 1.5 steadily falls to 5%.

FIG. 4.4 shows a comparison of the signal patterns of the signal originally generated by the air mass flow sensor, which for pulsation amplitudes $25 \geq 1$ has an error of more than 15%. By contrast, the signal of the pulsation amplitude $\geq 1$ plotted as a thin line and filtered and smoothed by the compensation circuit according to the representation in FIG. 2 has an error in the order of 5%.

FIG. 5.1 shows frequency response characteristics of filter components, which can be used within multiple frequency filter 12 according to the representation in FIG. 2. In the representation according to FIG. 5.1, the frequency response characteristics of a low-pass filter, a frequency response characteristic of a high-pass filter 32 as well as the frequency response characteristic of a flow bypass are represented for the most simple case. Measuring elements for measuring the air mass flow are normally integrated into a flow bypass. This is provided for aerodynamic reasons and keeps contaminants away from the measuring element. On the other hand, the bypass is also used for damping rapidly varying flow components, which include high frequency pulsations and turbulences. The geometry of bypass 33 on the one hand may be optimized with a view to minimum contamination and on the other hand with a view to pulsation damping.

The representation according to FIG. 5.3 shows the frequency response characteristics of a low-pass filter 31, of high-pass filter 32, of flow bypass 32 as well as a frequency response characteristic 34 of a band-pass filter. The frequency response characteristics of the representation in FIG. 5.2 correspond to a characteristics map dimension n=3 (cf. representation according to FIG. 2, correction characteristics map 16) and reflect the characteristic of the exemplary circuit implemented there. If the second characteristics map dimension is reduced from m to m=2, then this corresponds to a correction that is a linear function of the amplitudes of the individual frequency ranges.

Figure 6:
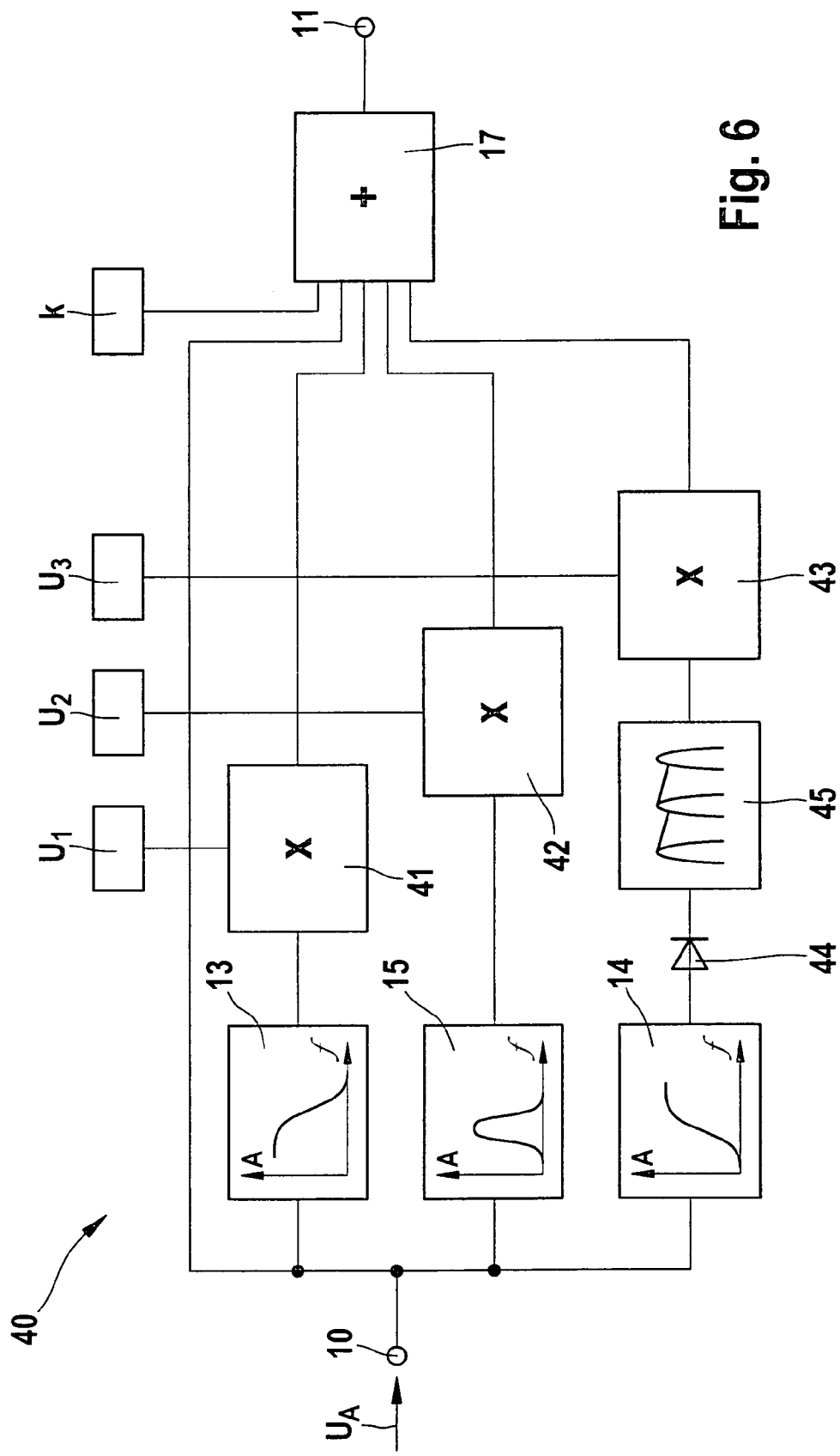
FIG. 6 shows a block diagram of an analog compensation circuit having multipliers, adders as well as filter stages.

For this case, the function of the compensation circuit can be reproduced using an analog circuit shown in FIG. 6.

FIG. 6 shows the block diagram of the analog compensation circuit. The multiplier, adder and filter stages are implemented by operational amplifiers.

Analogous to the representation according to FIG. 2, the signal input of signal voltage $U_A$ is indicated by reference numeral 10, while the signal output behind adder 17 is indicated by reference numeral 11. Input signal $U_A$ is on the one hand fed directly to adder 14, to which a constant voltage k is applied. On the other hand, input signal $U_A$ is fed to low-pass filter 13, to high-pass filter 14 as well as to band-pass filter 15. Low-pass filter 13 is followed by multiplier 41 (low-pass), to which in turn a constant voltage $U_1$ is applied. Band-pass filter 15 is followed by another multiplier 42 (band-pass), to which in turn a constant voltage $U_2$ is applied. High-pass filter 14 is followed by a blocking diode 44 as well as by a smoothing stage 45. Smoothing stage 45 of high-pass filter 14 is followed by a third multiplier 43 (high-pass), to which in turn a constant voltage $U_3$ is applied. Constant voltages $U_1$, $U_2$, $U_3$ and k can be set by a voltage divider to between GND and $U_{Ref}$=+5 V, where k corresponds to an offset, while voltages $U_1$, $U_2$ and $U_3$ to the gradients of the characteristics map entries of correction characteristics map 16, which takes the form of an m×n matrix.

Multipliers 41, 42 and 43 used in compensation circuit 40 according to the representation in FIG. 6 can take the form of operational amplifiers.

With the aid of the analog compensation circuit 40 shown in FIG. 6 it is possible to obtain the compensated signal patterns represented by thin lines in FIGS. 3.1 through 3.4 for the first frequency $f_1$ (58 Hz), which are distinguished with respect to pulsation amplitude 25 by a significantly reduced error component in comparison to the original signal of the air mass flow sensor for air mass flows 21, 22, 23, 24. The components of the total pulsation error that grow in a linear manner with a growing pulsation amplitude 25 are significantly reduced by compensation circuit 40 as in the sequence of FIGS. 3.1 through 3.4 for the first frequency $f_1$ of 58 Hz as well as in the representation according to FIGS. 4.1 through 4.4 for the second frequency $f_2$ of 145 Hz.

If compensation circuit 40 shown in FIG. 6 is implemented in a digital manner, or if a digital circuit corresponding to it is integrated into an ASIC of a hot air mass flow sensor, then multipliers 41, 42 and 43 may be omitted completely. In this case, the multiplication is replaced by a determination of the amplitudes of individual frequency ranges and the appropriate addressing of correction characteristics map 16. This in turn makes it possible to increase the dimension m of correction characteristics map 16 further, which allows for a further reduction of the occurring pulsation errors.

The basic measurements represented in the sequences of FIGS. 3.1 through 3.4 and 4.1 through 4.4 provide the basis for voltages $U_1$, $U_2$, $U_3$ and k. The measurements may be carried out at a pulsation test stand. Supplementary measurement may be carried out at engine test stands for combustion engines in the course of the application work. The more basic measurements and supplementary measurements are available as individual measurements, the greater is the application range that compensation circuit 40 is able to cover, whether it takes an analog or a digital form or whether it is integrated into an ASIC.

Figure 7:
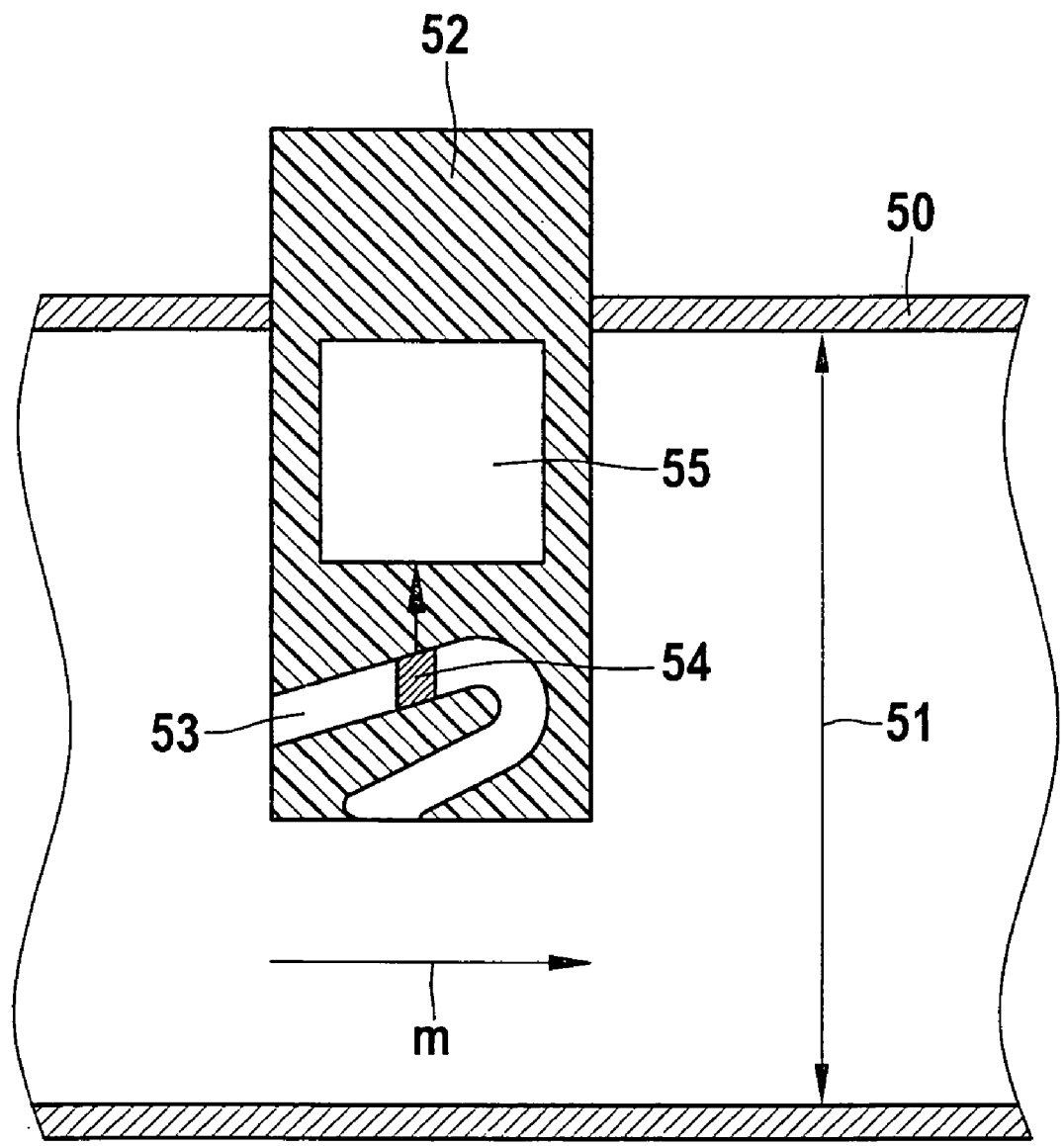
FIG. 7 shows a representation of a plug sensor extending into a measuring tube.

For applications, in which no specifically adjusted pulsation correction is required or desired, the entire correction function can be switched off in that all correction variables in correction characteristics map 16 are set to the value 0. The representation according to FIG. 7 shows that a plug sensor 52 is inserted into a measuring tube 50, which has a flow cross-section 51. An electronics 55 is integrated into the body of plug sensor 52. Further, plug sensor 52 receives a bypass 53, into which a measuring element 54 is integrated. Measuring element 54 integrated into bypass 53 is connected to electronics 55. The air mass flow flowing in measuring tube 50 is indicated by m. Bypass 53 is provided for aerodynamic reasons and is further used to keep contaminants away from measuring element 54. On the other hand, bypass 53 can also be used to dampen rapidly varying flow components, including high frequency pulsations and turbulences.

LIST OF REFERENCE NUMERALS a original characteristic curve
b modified characteristic curve
m air mass flow
$m_{max}$ maximum air mass flow
$U_1$ constant signal voltage $U_A$
U pulsating signal voltage
$U_{max}$ maximum signal voltage $U_A$
$U_{min}$ minimum signal voltage $U_A$
$m_1$ air mass flow at $u_1$
$m_{min}(b)$ air mass flow at $U_{min}$ (characteristic curve region b)
$m_{max}(a)$ air mass flow at $U_{max}$ (characteristic curve region a)
10 signal input $U_A$
11 signal output
12 multiple frequency filter
13 low-pass filter
14 high-pass filter
15 band-pass filter
16 correction characteristics map (m×n matrix)
17 adder
20 1. frequency $F_1$=58 Hz
21 1. air mass flow 10 kg/h
22 2. air mass flow 30 kg/h
23 3. air mass flow 60 kg/h
24 4. air mass flow 90 kg/h
25 pulsation amplitude
30 2. frequency $F_2$=145 Hz
31 frequency response characteristic of low-pass filter
32 frequency response characteristic of high-pass filter
33 frequency response characteristic of flow bypass 53
34 frequency response characteristic of band-pass filter
40 block diagram of compensation circuit
$u_1$ 1st constant voltage
$u_2$ 2nd constant voltage
$U_3$ 3rd constant voltage
k 4th constant voltage
41 multiplier (low-pass)
42 multiplier (band-pass)
43 multiplier (high-pass)
44 blocking diode
45 smoothing stage
50 measuring tube
51 flow cross-section
52 plug sensor
53 bypass
54 measuring element
55 electronics

What is claimed is:

1. A device for a pulsation correction of a measured value of a flow measuring device, comprising:
    an analog compensation circuit including a multiple frequency filter;
    a correction characteristics map assigned to the multiple frequency filter as an m×n matrix; and
    an adder for adding an entry of the characteristics map in the correction characteristics map to a raw signal,
    wherein the multiple frequency filter includes at least one low-pass filter, at least one high-pass filter, and at least one band-pass filter.

2. The device as recited in claim 1, further comprising:
    a smoothing stage connected in series in the at least one high-pass filter.

3. The device as recited in claim 1, further comprising:
    a multiplier succeeding the low-pass filter, the high-pass filter, and the band-pass filter.

4. A device for a pulsation correction of a measured value of a flow measuring device, comprising:
    an analog compensation circuit including a multiple frequency filter;
    a correction characteristics map assigned to the multiple frequency filter as an m×n matrix; and
    an adder for adding an entry of the characteristics map in the correction characteristics map to a raw signal,
    wherein filter stages of the multiple frequency filter having constant voltages for the purpose of compensation have pulsation characteristics of an air mass flow sensor applied to them.

5. A device for a pulsation correction of a measured value of a flow measuring device, comprising:
    an analog compensation circuit including a multiple frequency filter;
    a correction characteristics map assigned to the multiple frequency filter as an m×n matrix; and
    an adder for adding an entry of the characteristics map in the correction characteristics map to a raw signal,
    wherein the compensation circuit is digitally integrated into an ASIC.

6. A device for a pulsation correction of a measured value of a flow measuring device, comprising:
    an analog compensation circuit including a multiple frequency filter;
    a correction characteristics map assigned to the multiple frequency filter as an m×n matrix; and
    an adder for adding an entry of the characteristics map in the correction characteristics map to a raw signal,
    wherein the compensation circuit in digital form comprises a multiple frequency filter and an adder, amplitudes of individual frequency ranges of the raw signal being determined and these being entered into address fields of the correction characteristics map.

7. A method for a pulsation correction of a measured value of a flow measuring device, comprising:
    detecting a pulsating gas flow in an internal combustion engine;
    feeding a raw signal to an adder of a compensation circuit;
    feeding the raw signal to a multiple frequency filter to produce a filtered signal, the multiple frequency filter including at least one high-pass filter, at least one low-pass filter, and at least one band-pass filter;
    writing the filtered signal into an address of a correction characteristics map; and
    adding a values stored in the address to the raw signal by the adder.

8. The method as recited in claim 7, wherein the at least one high-pass filter, the at least one low-pass filter, and the at least one band-pass filter are represented by transfer functions.

9. The method as recited in claim 7, further comprising:
    smoothing the raw signal in a smoothing stage behind the at least one high-pass filter.

10. The method as recited in claim 7, wherein:
    the correction characteristics map includes an m×n matrix, and
    every frequency component of the raw signal is assigned a column containing address fields.

11. The method as recited in claim 7, wherein the filters of the multiple frequency filter are compensated via the specification of constant voltages for components of a compensation circuit having pulsation characteristics of the pulsating flow.

12. The method as recited in claim 11, wherein voltages for weighting the frequency components of the multiple frequency filter are variable corresponding to gradients of characteristics map addresses in the correction characteristics map.

* * * * *